June 17, 1969 R. M. DAVIDSON ET AL 3,450,468

PROJECTION SYSTEM FOR PROJECTING CONSTANT SIZE IMAGES FROM VARIABLE SIZE FRAMES

Filed June 16, 1966

Inventors.
Richard M. Davidson,
James Reekie.

By John E. Leele Jr. Atty

United States Patent Office 3,450,468

Patented June 17, 1969

3,450,468

PROJECTION SYSTEM FOR PROJECTING CONSTANT SIZE IMAGES FROM VARIABLE SIZE FRAMES

Richard M. Davidson, Northbrook, and James Reekie, Wilmette, Ill., assignors to Bell & Howell Company, Chicago, Ill., a corporation of Illinois Filed June 16, 1966, Ser. No. 558,122
Int. Cl. G03b *31/02*
U.S. Cl. 352—26 15 Claims

ABSTRACT OF THE DISCLOSURE

A disk support and apparatus for projecting a series of equal sized images from a plurality of image frames of differing sizes mounted on a common support. The apparatus moves the support to locate successive frames for projection by a variable focal length projection lens, and adjusts the lens in accordance with the size of the particular frame so that all images are projected at essentially the same size.

The present invention relates to the novel combination of a record disc on which different sized image frames are spirally displayed, and a projector for projecting the images from the disc onto a surface at a constant size.

Some conventional projectors project motion pictures from equal-sized frames of film displayed in a spiral on a disc. Because of several drawbacks, however, these projectors have had limited acceptance by the buying public. One drawback is the short projection time obtainable with each disc. The maximum projection time for a conveniently sized disc is determined by the number of frames displayable on it. In some cases, such as U.S. Patent 2,186,753, the discs are intermittently rotated thereby preventing the inclusion of an audio track on the disc. In others, the images are intermittently projected as the disc is rotated at constant angular speed. A conventional device of this type is illustrated in U.S. Patent 1,933,057. Although constant angular speeds are desired when a sound track is on the disc, the playing time of such a disc is extremely short since there is much wasted space between the frames on the outermost portions of the disc. This is true because the frames are all of the same size and are arranged on the disc in radial rows extending outwardly from an area near the center of the disc and frames near the periphery of the disc are consequently widely spaced from each other. This spacing is necessary so that the disc can rotate angularly the same amount in any given time period to present successive frames in synchronization with the projecting means.

Other conventional projectors employ a variable speed means for rotating the disc so that each specific frame moves at a given linear speed with respect to the optical system as it moves past the optical system. A device of this type is illustrated in U.S. Patent 2,346,472. Devices of this type enable close spacing of adjacent frames over the entire periphery of the disc; however, they suffer from the disadvantage that they cannot be used for playing conventional phonograph discs (which require constant angular speed rotation). Another drawback of devices of this type is that they are relatively complex and expensive.

To overcome the limitations of the above system, the novel combination of this application includes an image displaying disc carrying a spiral array of image frames. The disc may also carry a sound track and is mounted in a projector for playing the disc at a constant angular speed. By reducing the size of each frame from the size of its predecessor by a substantially constant amount, the frames are arranged on the instant disc to efficiently use all of its available space while retaining the advantages of the discs played at constant angular speeds. The smallest frame is large enough to project well, but small enough to enable a larger number of frames to be placed in all of the convolutions of the spiral than can be done in any of the prior art systems. The disc in the instant system is continuously rotated at a constant angular speed so that, if desired, a sound track can be provided integral with the disc so as to provide picture-sound synchronization. Thus, the advantages of both prior systems are combined in one relatively simple system.

The instant projector is provided with a variable magnification means which operates by varying the focal length of the optical system so that the images from different sized frames are projected onto a projector image receiving surface so that all projected images are the same size. The variation in magnification will be expressed as a variation in focal length throughout the specification since this is the basic quantity varied. However, it should be kept in mind that the focal length variation produces variation in magnification. To coordinate the change of focal length with the change in the size of the frame on the disc, a novel mechanism is connected to adjust the focal length varying component of the optical system as different sized frames are aligned in the projection axis. With this novel mechanism, if it is desired to project the middle portion of the disc only, the lens is adjusted automatically for the size of the frame at that portion.

Thus, an object of the invention is to provide a novel record disc on which frames of different sizes are displayed.

Another object is to provide a novel record disc on which the size of each frame displayed in a convolution of a spiral on the disc is different from the size of the adjacent frames.

Yet another object of this invention is to provide a novel projector for projecting constant sized picture images from frame of different sizes on a record disc.

Yet another object is to provide a novel projector employing variable focal length optics for automatically projecting motion pictures of a constant size from different sized frames displayed on a record disc.

These and other objects of the present invention will become more apparent from the following description when read with the accompanying drawings in which.

Figures 1, 2, 3, 4, 5, 6:
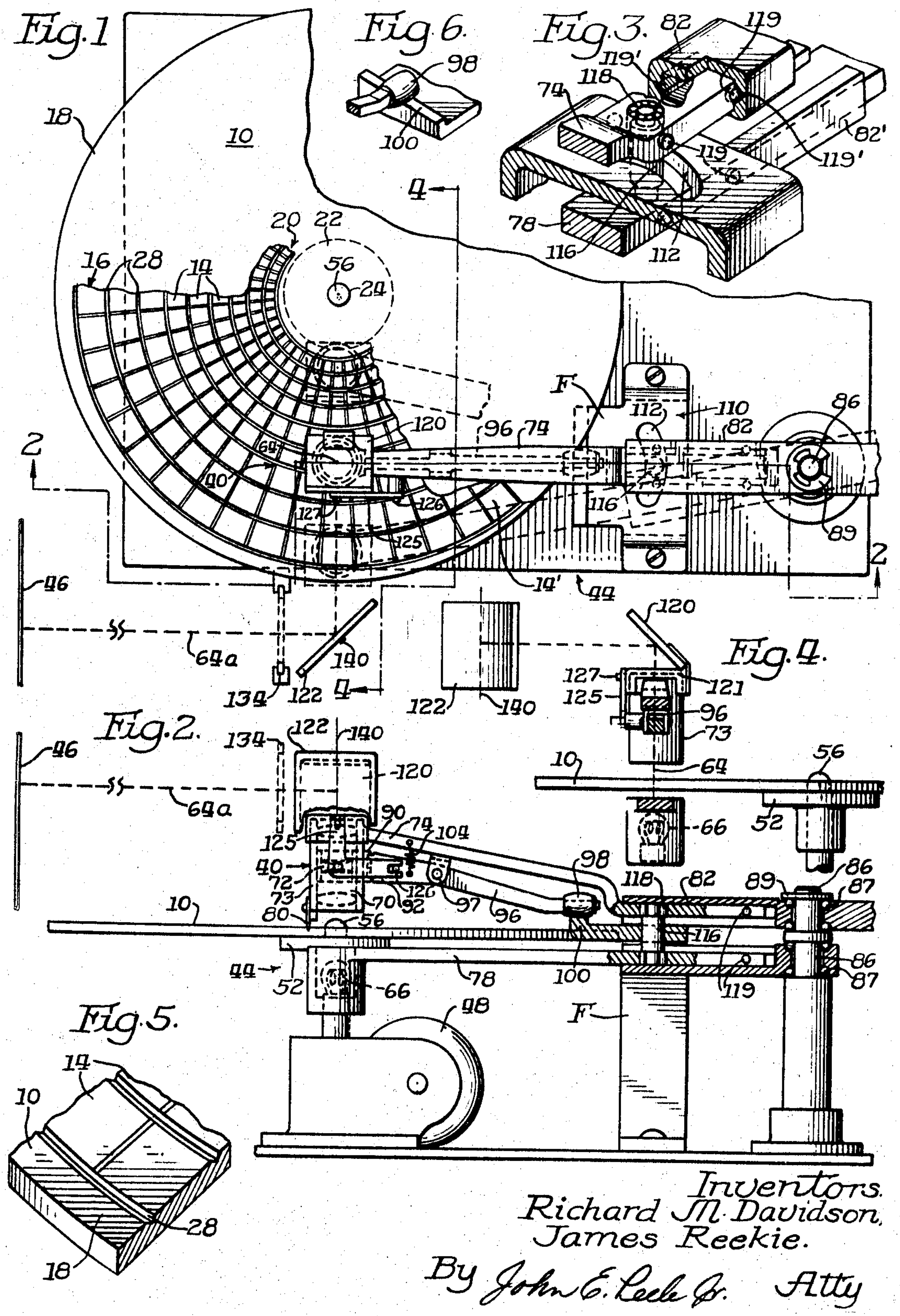
FIG. 1 is a plan view of a projector and its associated film disc of a preferred embodiment of this invention.
FIG. 2 is an elevational partial sectional view of the projector of FIG. 1 taken along line 2—2 of FIG. 1.
FIG. 3 is a perspective cutaway view of a portion of supporting means for the optical system of the preferred embodiment.
FIG. 4 is a sectional view taken along section line 4—4 in FIG. 1.
FIG. 5 is an enlarged perspective view of a portion of the record disc in FIG. 1.
FIG. 6 is a perspective view of cam and follower means for varying the focal length of the optical system of the preferred embodiment.

A record disc 10, illustrated in FIG. 1, has a plurality of different sized image frames 14 mounted thereon which images 14 are arranged to be projected as a motion picture. The frames are formed either directly on the disc of transparent material or on a film fixed to the disc. The frames are arranged in a spiral with its largest convolution 16 beginning near the periphery 18 of the disc, and with its smallest convolution 20 ending near the hub 22 of the disc. A spindle hole 24 is provided in the center of hub 22. The largest frame 14', which is located near the periphery of the disc, is in a first format and area size. Each succeeding frame in the spiral has the same general format but a slightly reduced area as compared to its preceding frame. Although the frame size change between adjacent frames is substantially constant, it varies slightly from a constant rate due to the fact that the radial width of space 28 between adjacent convolutions remains constant.

The direction of playback of the disc can be such that either the largest or the smallest image frame 14 on disc 10 is first to be reproduced. Nevertheless, the largest frames must be outermost on the disc to best utilize the available space. Furthermore, as seen in FIG. 1, the sizes of consecutive frames 14 are reduced both in width and height with a constant ratio between these dimensions so that all frames are of essentially the same format.

Although the radial width of groove space 28 between convolutions of frames can be varied, it is preferably maintained constant throughout the length of the spiral to support a sound track. Although the sound track is shown in FIG. 5 as a groove cut into the disc as in home records, it may be any of the known forms so long as it is fixedly associated with the disc to maintain sound picture synchronization with the frame projected.

The groove forming the sound track in space 28 in the embodiment shown also serves as a guiding means for causing the proper tracking of a movable optical system 40 of a projector 44 used for projecting the frames on the disc. Other guiding devices or a blank (no sound) groove may be used if the record disc is silent or provided with another type of sound track.

FIGS. 1–4 illustrate the components of projector 44 which are employed for projection of motion picture images from frames 14 on disc 10. Although the frames vary in size, the images are projected at a constant size onto a projected image receiving surface such as rear screen 46. The projector includes a motor 48 for rotating a disc support 52 at a constant angular speed. Discs are placed on support 52 so that spindle 56 extends into spindle hole 24. Projection of images from the disc occurs when frames are aligned with the optical axis 64 of optical system 40. A light source 66 enclosed within the projector housing, (shown only as a deck 68 in FIG. 1) projects an image of each particular frame into optical system 40. The optical system, as illustrated in FIG. 2, includes a short focal length projection lens 70 and a "zoom" element 72 for varying the focal length of the system. Although the maximum and minimum focal lengths of the system are selected for particular projection distances and screen sizes, the ratio of these focal lengths is substantially equal to the ratio of the size of the smallest to largest frames of the disc. By using similar ratios, the smallest frames are magnified during projection up to the same size as the larger frames.

Other components of the optical system are a shutter device and condensers (not shown) which are positioned between the projection lens 70 and light source 66 in their conventional relationships, such as is shown in U.S. Patent 2,186,753. Since these elements form no part of the present application, they are not further described.

Components of optical system 40 are supported by a support tube 73 attached to a first pivoted carrier 74. Light source 66 is attached to the end of a second pivoted carrier 78. The first and second carriers are connected together for unitary pivotal movement in planes parallel to the surface of disc 10 in a manner to be discussed hereinafter. As shown, projection lens 70 is supported on the first carrier or support arm 74, and the light source 66 on the second carrier or support arm 78. It is understood, however, that this orientation of the lens and the light source may be reversed. When a disc is placed on support 52, the carriers are positioned so that the axis 64 of the optical system is aligned with a first frame on the disc to project that frame when the light source is energized. As the disc rotates, other frames are aligned with the axis, and projected. Movement of optical system 40 and light source 66 is synchronized with the rotation of the disc by a tracker or groove follower 80 which can be in the form of a phonograph needle and which is vertically adjustably mounted on the optical system support tube 73 to move in the guiding track 28 on the disc. Consequently, the optical system moves inwardly or outwardly to follow the convolution of frames. Carriers 74 and 78 are respectively received in sleeves 82 and 82′ which are mounted for relatively friction free pivotable movement on a pin 86 by low friction bearings 87. Pin 86 is mounted on a housing frame member 88 and sleeves 82 and 82′ are retained on pin 86 by a clip 89 adjacent the upper surface of sleeve 82. A conventional balancing means of the type employed into phonograph (not shown) can be provided on the end of the carrier remote from optical system 40 to offset the weight of the optical system components and maintain a desired tracking force between tracker 80 and track 28.

Variation of the focal length of the lens system is caused by slidable axial movement of the zoom element 72 within support tube 73. A small rack 90 is connected to element 72 to cause it to move axially when a gear segment 92 mating with the rack and formed on one end of a linkage member 96 is rotated. Linkage member 96 is pivotally mounted on pin 97 on the lens supporting carrier 74. A cam follower 98 (FIG. 6) on the other end of linkage member 96 engages a fixed cam 100 located near the pivot axis for the carriers. Pivotal movement of carrier 74 and the linkage member 96 about pin 86 causes member 96 to be pivoted about pin 97 by cam 100 against the urging of a biasing member such as a spring 104. Spring 104 biases the linkage member to maintain contact of follower 98 with the cam. Cam 100 is shaped so that zoom component 72 is moved as required to vary the focal length of lens 70, and can be shaped to compensate for any non-linearity of focal length variation in component 72. Thus, by the co-ordination of compensator cam 100 and zoom component 72 through linkage member 96, the focal length of the projection lens system is appropriately varied to insure the correct magnification by the system for all sizes of frames 14 of disc 10.

An optical system and tracker position adjustment means is provided to move the optical axis 64 radially of the disc rather than arcuately, as would be the case if no adjustment means were employed. Such radial movement is provided by a cam slot 112 (FIGS. 1 and 3) formed in frame member F to guide a freely rotatable roller 116 which is connected between carriers 74 and 78 by roller bearings 118. The carriers are supported for low friction linear movement wtihin sleeves 82 and 82′ by ball bearings 119 in V-grooves 119′ in sleeves 82 and 82′ and are reciprocated back and forth relative to the pin 86 by roller 116 and cam slot 112. Consequently, optical axis 64 is caused to move in a substantially radial path relative to spindle 56. An alternative form of adjuster (not shown) can consist of rods extending radially of the spindle. These rods would be positioned substantially parallel with, and adjacent to the plane to be occupied by the disc 10. The optical system would be guided for radial movement on such rods. Cam follower 98 is provided with an adequate axial extent so that the reciprocating movement of carrier 74 does not cause the follower to disengage cam 100.

The radial movement of the optical system prevents tilting movement of consecutive images projected on surface 46 as the optical system 40 moves relative to disc 10. A first reflector 120 is rotatably attached to support tube 73 so as to be positioned in optical axis 64 to receive the image from the frame aligned in the axis. Reflector 120 is mounted on a rotatable support ring 121 for rotation about optic axis 64. An image received by reflector 120 is deflected approximately 90° and directed to a second reflector 122 mounted for pivotal movement about a pivot 140. It is necessary that reflector 120 be rotated about the optic axis as the optical system moves radially with respect to disc 10 in order that the image from reflector 120 will always be directed to reflector 122. This rotation of reflector 120 is accomplished by a toggle link 125 which is pivotally attached to support tube 73 and has one slotted end engaging a pin 126 on linkage member 96. A slot on the other end of toggle link 125 engages a pin 127 on the rotatable support ring 121. Pivotable movement of linkage member 96 about pivot 97 (caused by cam 100 etc.) moves pin 126 which causes toggle link 125 to rotate the reflector and maintain the desired alignment.

The second reflector 122 is positioned slightly beyond the periphery of disc 10 and receives the image from the first reflector 120 and deflects that image through a shaping mask 134, and along an optical path 64*a* toward the screen surface 46. The optical path beyond second reflector 122 may be either straight or folded by other reflectors (not shown) so that enough path length is provided to obtain the desired image size on a screen. A folded path is preferred if both the projector and screen are to be self-contained, as in this embodiment.

Because the disc 10 is continuously rotated rather than intermittently moved as in the prior art, it is necessary to compensate for the continuous image motion of the frame as it passes the optical axis 64. This compensation is accomplished by rocking reflector 122 about axis 140 in a manner such as is shown in U.S. Patent 1,933,057. Reflector 122 is rocked at such a speed as to compensate for the movement of the projected image on screen 46 as would be created by movement of disc 10 relative to the optical system if it were not for the rocking movement of reflector 122.

Although the length of optical path 64, 64*a* changes as the preferably fixed focus lens 70 moves relative to the screen 46, sharp focus of the image on the screen is maintained by taking advantage of the substantial depth of field of the short focal length lens as it projects images over a reasonably long path length. Since the distance between the lens and the plane of the frame does not change, continuous focusing of the lens is normally unnecessary, as can be readily understood by those skilled in the art.

It should also be understood that additional lenses can be employed at suitable locations on path 64*a* to provide accurate focusing of the projected images over a wide variation of the total length of the optical path, if desired.

In operation of the device of the preferred embodiment, disc 10 is placed on spindle 56 on support 52. Carriers 74 and 78 are then positioned manually or otherwise to locate tracker 80 in the track 28 of the disc. Energization of the motor 48 causes rotation of disc support 52, operation of the shutter, and oscillation of reflector 122. After the first frame on the disc is projected, the others follow as the carriers move radially of the disc and the focal length of projection lens 70 system is automatically changed in accordance with the position of the carrier relative to the disc support 52.

While the invention has been particularly described with reference to a particular embodiment thereof, it is to be understood that modifications and variations may be effected without departing from the spirit and scope of the invention.

The embodiments of the invention in which an exclusive property or privilege is claimed are defined as follows:

1. In a disc for use in a projection apparatus for projecting images of constant size onto an image receiving surface, the invention comprising:

a plurality of different size transparency image frames adapted for individual projection and arranged in a spiral on said disc wherein the size of any particular frame is greater than the size of any other frame located near the center of the disc.

2. A disc as recited in claim 1 wherein said spiral of frames is formed with adjacent convolutions spaced apart by a constant radial width groove over the entire extent of the spiral.

3. A disc as recited in claim 1 wherein the width of frames located adjacent the periphery of the disc is greater than the width of frames located nearer the center of the disc.

4. The disc as recited in claim 3 wherein adjacent frames in adjacent convolutions of said spiral are aligned symmetrically with respect to a common radius of said disc.

5. The disc as recited in claim 4 wherein the size of each respective frame in said spiral increases in substantial proportion to the distance of each respective frame from the center of said disc.

6. In a projector for projecting motion picture images onto a projected image receiving surface from a disc having a plurality of different sized image frames thereon, the invention comprising:

means supporting said disc for rotation;

a variable focal length optical system mounted adjacent said disc to receive images projected from said frames and to direct said images onto said image receiving surface; and means to change the focal length of said optical system in response to movement of a frame of a particular size into said position adjacent said optical system so that different sized frames project images of equal size on said projected image receiving surface.

7. The projector as recited in claim 6 including a carrier mounting a portion of said optical system for movement across the disc in response to rotation of the disc so that successive frames on the disc are successively aligned with said optical system for projection onto said projected image receiving surface.

8. The projector as recited in claim 7 wherein the means for moving said carrier includes means for moving said optical system in a radial path across said disc when said disc is rotated.

9. The device of claim 8 wherein said optical system further includes:

first reflecting means for directing the image projected from said disc along a path parallel to a radius of said disc; and control means for rotating said reflecting means in accordance with the radial position of the optical system with respect to said disc so that said reflecting means always directs said image along the same path for all radial positions of the optical means with respect to said disc.

10. The device as recited in claim 7 wherein the optical system focal length changing means includes a zoom component and means for operating said zoom component to vary the focal length of said system in response to rotation of said disc.

11. The device as recited in claim 10 wherein the means for operating said zoom component includes a linkage member operatively connected between said zoom component and a compensator cam on said projector whereby the focal length of said optical system is automatically adjusted in response to rotation of said disc and images projected from said disc onto said projected image receiving surface are all of the same size.

12. The projector of claim 11 including means for moving said optical system in a radial path across said disc when said disc is rotated.

13. The device as claimed in claim 6 wherein a ratio of the size of the largest image frame to the smallest image frame on the disc is substantially the same as the ratio of the maximum and minimum focal lengths of the optical system.

14. A motion picture projection system comprising the combination of:

a disc including a hub and containing a spiral array of different sized image frames of increasing size spiraling outwardly from a point adjacent the hub of said disc;

means rotatably mounting said disc;

a light source mounted adjacent one side of said disc for projecting light through said image frames;

optical means mounted in alignment with said light source on the other side of said disc and having selectively variable focal length;

means for actuating said means for rotatably mounting said disc for rotating said disc at a constant angular speed so that successive image frames thereon are successively aligned with said light source and said optical means;

first reflecting means for receiving successive images projected from said successive image frames through said optical means, said reflecting means being mounted for rotation about the optic axis of said optical means;

a second reflecting means for receiving an image directed from said first reflecting means;

support mounting said optical means, said light source and said first reflecting means to enable movement thereof radially across said disc;

means on said disc engaging said support means for causing said optical means, said first reflecting means and said light source to move radially thereof in response to rotation of said disc;

control cam means for varying the focal length of said optical means in response to the radial position of said optical means with respect to said disc;

further control means for rotating said first reflecting means about said optic axis in response to the radial position of said optical means, said reflecting means and said light source with respect to said disc whereby images of constant size are projected onto a projected image receiving surface from said image frames of differing sizes.

15. In a disc for use in a projection apparatus for projecting images of constant size onto an image receiving surface, the invention comprising:

a plurality of different size image frames arranged in a spiral on said disc, said spiral of frames being formed with adjacent convolutions spaced apart by a constant radial width groove over the extent of the spiral, said groove having a sound track therein wherein the size of any particular frame is greater than the size of any other frame located nearer the center of the disc.

References Cited

UNITED STATES PATENTS

| | | | |
|---|---|---|---|
| 1,913,913 | 6/1933 | Boularan | 352—26 |
| 2,077,369 | 4/1937 | Kark | 88—26 |
| 2,154,013 | 4/1939 | Schillaci | 88—26 |
| 2,203,437 | 6/1940 | Levy | 352—26 |
| 2,455,712 | 12/1948 | Von Soden | 352—26 |
| 3,124,034 | 3/1964 | Edhouse | 352—26 |

NORTON ANSHER, *Primary Examiner.*

ROBERT A. SCHROEDER, *Assistant Examiner.*

U.S. Cl. X.R.

352—37, 103, 232; 353—19